United States Patent [19]

Lindemann et al.

[11] Patent Number: 4,686,260
[45] Date of Patent: Aug. 11, 1987

[54] PRINTING INK COMPOSITION

[75] Inventors: Martin K. Lindemann, Greenville; Kim Deacon, Rockhill, both of S.C.

[73] Assignee: Sun Chemical Corporation, New York, N.Y.

[21] Appl. No.: 934,796

[22] Filed: Nov. 25, 1986

Related U.S. Application Data

[63] Continuation-in-part of Ser. No. 911,081, Sep. 24, 1986, which is a continuation-in-part of Ser. No. 753,685, Jul. 10, 1985, Pat. No. 4,616,057.

[51] Int. Cl.$^4$ ................................................. C08K 3/20
[52] U.S. Cl. .................................... 524/458; 523/222; 525/903
[58] Field of Search ......................... 524/458; 523/222; 525/903

[56] References Cited

U.S. PATENT DOCUMENTS

| | | | |
|---|---|---|---|
| 2,392,585 | 1/1946 | Fryling | 524/458 |
| 2,460,300 | 2/1949 | Le Fevre et al. | 260/86.5 |
| 2,754,280 | 7/1956 | Brown et al. | 525/329.6 |
| 3,236,798 | 2/1966 | Dunnavant et al. | 524/458 |
| 3,397,165 | 8/1968 | Goodman et al. | 260/29.7 |
| 3,426,101 | 2/1969 | Ryan et al. | 260/876 |
| 3,671,610 | 6/1972 | Amagi et al. | 260/880 R |
| 3,732,184 | 5/1973 | Lindemann et al. | 526/87 |
| 3,812,205 | 5/1974 | Dunkelberger | 260/885 |
| 3,833,404 | 9/1974 | Sperling | 117/63 |
| 4,119,746 | 10/1978 | Bleyle | 524/458 |
| 4,122,136 | 10/1978 | Korte et al. | 260/898 |
| 4,133,788 | 1/1979 | Sahajpal et al. | 524/458 |
| 4,244,845 | 1/1981 | Woo | 524/458 |
| 4,254,004 | 3/1981 | Abbey | 524/458 |
| 4,263,193 | 4/1981 | Sakimoto et al. | 524/458 |
| 4,265,977 | 5/1981 | Kawamura et al. | 428/511 |
| 4,325,856 | 4/1982 | Ishikawa et al. | 523/201 |
| 4,409,355 | 10/1983 | Heimberg | 524/458 |
| 4,427,836 | 1/1984 | Kowalski et al. | 525/301 |
| 4,448,923 | 5/1984 | Reeb et al. | 524/460 |
| 4,448,924 | 5/1984 | Reeb et al. | 524/460 |
| 4,459,378 | 7/1984 | Ugelstad | 523/205 |
| 4,468,498 | 8/1984 | Kowalski et al. | 525/301 |
| 4,513,118 | 4/1985 | Suetterlin et al. | 525/81 |
| 4,530,956 | 7/1985 | Ugelstad | 524/458 |
| 4,539,361 | 9/1985 | Siol et al. | 524/460 |
| 4,569,954 | 2/1986 | Lee et al. | 524/460 |

OTHER PUBLICATIONS

L. H. Sperling, "Interpenetrating Polymer Networks and Related Materials", 1977, *J. Polymer Sci*, vol. 12, 141–180.

A. J. Curtius et al., "Polybutadiene/Polystyrene Interpenetrating Polymer Networks", 1972, *Polymer Eng. & Science*, vol. 12, No. 2, 101–108.

Sperling et al., "Glass Transition Behavior of Latex Interpenetrating Polymer Networks Based on Methacrylic/Acrylic Pairs", 1973, *J. App. Pol. Sc.*, vol. 17, 2443–2455.

M. Narkis et al., "Properties and Structure of Elastomeric Two-Stage Emulsion Interpenetrating Networks", 1985, *Polymer*, vol. 26, August (Conference issue), 1359–1364.

*Primary Examiner*—Joseph L. Schofer
*Assistant Examiner*—N. Sarofim
*Attorney, Agent, or Firm*—Mitchell D. Bittman

[57] ABSTRACT

A printing ink composition is prepared containing a pigment and a polymer emulsion which comprises a first polymer network which is intertwined on a molecular scale with a second polymer network.

11 Claims, No Drawings

PRINTING INK COMPOSITION

RELATED APPLICATIONS

This application is a continuation-in-part of application, Ser. No. 911,081, filed Sept. 24, 1986 which is a continuation-in-part of application, Ser. No. 753,685, filed July 10, 1985, now U.S. Pat. No. 4,616,057, issued Oct. 7, 1986.

BACKGROUND OF THE INVENTION

This invention relates to a process for preparing a polymer emulsion containing colloidally suspended therein an interpenetrating polymer network wherein a first polymer network is intertwined on a molecular scale with a second polymer network and optionally additional polymer networks. The polymer emulsion of this invention is useful as a binder for paper coatings and printing inks.

In the preparation of a coated cellulosic web, e.g. a paper web, there is used a pigment, such as clay or the like, sometimes with other materials such as, for example, a soluble pyrophosphate which may act to disperse the pigment in water and stabilize the pigment in water. This mixture, commonly termed a pigment "slip" or, since it usually contains clay, a clay "slip", is then compounded with a binder or adhesive material to produce a composition known in the art as a coating "color", which is useful for coating a cellulose web, e.g. a paper or paperboard web. Substantial quantities of the binder are used, and, accordingly, the composition and characteristics of the binder are of great importance in determining the qualities of the finished coated web. It is important that the binder contributes to the coating or the finished coated web a high degree of brightness, smoothness and gloss, and a good finish and feel after calendering. In addition to these basic qualities required in coatings, the coating color must flow smoothly and evenly so that it can be applied to the cellulosic web at sufficiently high speeds to be economical in ordinary coating processes; and the coating must have high strength, to permit subsequent printing on the coated paper without "picking," i.e. it must have good "pick" characteristics.

Polymer emulsions are useful as a coating binder for paper and paperboard. Paper is coated to provide a smoother surface with increased strength, whiteness and absorbability in order to provide a better surface on which to print. Coating formulations for paper and paperboard can contain a variety of binders including all-latex binders, protein-latex binders, all-starch binders or latex-starch blends. The end use of the paper and, in particular, the method by which it will be printed, may determine which binder type is used in the coating. The major printing method is the offset method in which both water (fountain solution) and an oil based ink are applied to the paper coating. The rate of absorption of the water layer and the ink into the coating is critical to producing a desirable high quality printing.

Styrene-butadiene copolymers are commonly used latex binders, followed by polyvinylacetate, vinylacetate-acrylic copolymers, ethylene-vinylacetate copolymers and all acrylic polymer emulsions. Styrene-butadiene and vinylacetate binders are widely used because of their low cost. The major drawback of styrene-butadiene binders is the poor water absorption giving high SIWA brightness values. High SIWA (simultaneous ink and water absorption test) brightness values mean the coating did not absorb the initially applied water layer and the subsequent ink application failed to penetrate this layer and absorb into the coating. The incomplete ink coverage produces a weak or spotty image. Vinyl acetate binders are often too water absorbent, resulting in press roll fountain solution milking. This problem is the converse of the high SIWA brightness problem. Fountain solution milking occurs when the coating absorbs so much water (fountain solution), that the coating becomes solubilized in the fountain solution and the binder and clay so dissolved give the solution a "milky" appearance. This condition can be predicted by the Adams Wet Rub Test.

Printing inks will generally contain a pigment or dyestuff and a vehicle as well as supplemental ingredients to impart special characteristics to inks such as driers, waxes, lubricants, reducing oils, antioxidants, gums, starches and surface active agents. The function of the vehicle is to act as a carrier for the pigment and as a binder to affix the pigment to the printed surface. The vehicle can contain in various combinations, resins, oils and solvents depending upon the printing method. For example a flexographic vehicle can contain either alcohols, water, or other fast evaporating solvents with suitable resins and gums, while a gravure vehicle can contain low boiling hydrocarbon solvents with gums and resins.

Printing inks use natural or synthetic resins to impart the properties of hardness, gloss, adhesion and flexibility which is important in the formulation of binders for the pigments. Synthetic resins are prepared by polymerization involving condensation or addition reactions between relatively small molecules. Various synthetic resins are utilized in different ink applications. For example, pure phenolic resins are used in conjunction with tung oil as a varnish for letterpress and lithographic inks; rosin modified phenolic resins have widespread use in all types of ink vehicle systems; alkyd resins are used in paste inks; polystyrene resins and copolymers thereof (e.g. with maleic anhydride) can be made water soluble for use in water based inks; thermoplastic polyamides are used in liquid inks; and acrylic and methacrylic polymers and copolymers thereof are used in flexographic, photogravure and tinprinting inks and high gloss lacquers. The resins are often used in combination with other resins or film forms to impart the properties desired for a particular application.

The polymer emulsion of this invention provides a binder which is suitable for use in a coating, especially as a coating for paper and paperboard, and in a printing ink.

SUMMARY OF THE INVENTION

Briefly, the present invention provides a process for preparing a polymer emulsion containing an interpenetrating polymer network by forming a first polymer emulsion, mixing a second monomer emulsion with the first polymer emulsion, allowing the emulsion mixture to equilibrate and polymerizing the emulsion mixture providing a first polymer network which is intertwined on a molecular scale with the second polymer network. This polymer emulsion is useful as a coating binder for paper and paperboard and as a binder in printing inks.

DETAILED DESCRIPTION OF THE INVENTION

The aqueous polymer emulsion containing an interpenetrating polymer network is prepared by forming a first polymer emulsion. The first polymer emulsion can be prepared by conventional batch, semi-continuous or continuous polymerization procedures. These are taught, for example in U.S. Pat. Nos. 2,754,280, 2,795,564, 3,732,184 and in the book entitled "The Applications of Synthetic Resin Emulsion" by H. Warson, Ernest Benn Limited, London, 1972, pp. 85 to 132. The first polymer emulsion can be formed by polymerizing a monomer or a mixture of monomers (herein called a first monomer) with an active crosslinking agent. Alternatively the first polymer emulsion can be formed by emulsifying a polymer. Examples of emulsified polymers include polyethylene emulsions, polyester emulsions, polyurethane emulsions and the like.

The first polymer emulsion is mixed with a second monomer emulsion and then the emulsion mixture is allowed to equilibrate. By equilibration is meant allowing sufficient time for the second monomer to become absorbed into the first polymer. The mixing and equilibration allows the second monomer emulsion to be thoroughly mixed and dispersed throughout the first polymer emulsion on a molecular scale. The second monomer emulsion can be added either as an emulsion or as a monomer or mixture of monomers which will emulsify during mixing with the first polymer emulsion.

Then, after thorough mixing and equilibration the emulsion mixture is polymerized providing a first polymer network which is intertwined on a molecular scale with the second polymer network, i.e. an interpenetrating polymer network is formed. Optionally, a third monomer emulsion can then be mixed in, equilibrated, followed by polymerization or further additional monomer emulsions can likewise be intertwined in the polymer networks. When the polymer emulsion is subsequently applied, dried and heated the physical and chemical bonding of the first polymer network with the second polymer network is completed.

Because of the interpenetrating network formed, desirable physical properties are achieved. Dual Tg (glass transition temperature) properties have been observed wherein the polymer has the Tg of both the first polymer and the second polymer. This is especially useful in the application of the polymer emulsion wherein modulus, tensile strength and desirable film forming properties can be adjusted by varying the ratio of the first and second polymers comprised in the interpenetrating network. Because the first and second networks are intertwined on a molecular scale higher tensile strength has been observed as well as higher modulus and higher impact strength at temperatures intermediate the Tg's of the first polymer and the second polymer.

The monomers which are polymerized in accordance with the present invention are vinyl monomers, ethylenically unsaturated compounds. Examples of monoethylenically unsaturated monomers are: vinyl esters of alkanoic acids having from 1 to about 18 carbon atoms, such as vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, vinyl ester (e.g. Versatic Acid-TM, a branched carboxylic acid, marketed by the Shell Oil Corporation), vinyl laurate, and vinyl stearate; also alpha-olefins, such as ethylene, propylene, butylene, isobutylene, and pentene and the like; also maleate, fumarate, and itaconate esters of $C_1-C_8$ alcohols, such as dibutyl maleate, dibutyl fumarate, dibutyl itaconate; also alkyl acrylates with an alkyl group having from 1 to 18 carbon atoms, such as methyl, ethyl, n-butyl, sec-butyl, the various isomeric pentyl, hexyl, heptyl, and octyl (especially 2-ethylhexyl), lauryl, cetyl, stearyl and like groups; also alkyl esters of methacrylic acid with an alkyl group having from 1 to about 18 carbon atoms, such as methyl, ethyl, propyl, n-butyl, n-hexyl, 2-ethylhexyl, n-octyl, lauryl, cetyl, stearyl and like groups; also vinyl alkyl ethers, having an alkyl group with 1 to 18 carbon atoms, such as methyl vinyl ether, ethyl vinyl ether, butyl vinyl ether and stearyl vinyl ether. Examples of monomers also include diene monomers, such as butadiene, chloroprene, and isoprene and similar compounds. Other monomers include aromatic vinyl monomers, such as styrene, alphamethylstyrene, vinyl toluene, 2-bromostyrene, and p-chlorostyrene; also acrylonitrile; also vinyl halide monomers, such as vinyl chloride and vinylidene chloride; also benzyl acrylate and t-butyl acrylate; also vinyl esters of aromatic acids, such as vinylbenzoate.

Preferably the polymer present in the first polymer emulsion is either polymethyl methacrylate, polyvinyl acetate, polybutylacrylate, vinylchloride ethylene copolymer, vinylacetate ethylene copolymer, polystyrene or polyacrylonitrile or copolymers of these with other monomers mentioned above, while the second polymer differs from the first polymer and preferably is based upon a monomer such as acrylo nitrile, methyl methacrylate, butyl acrylate, styrene or mixtures thereof.

In order to obtain desirable dual Tg properties, the polymer in the first polymer emulsion and the polymer derived from the second monomer emulsion can be chosen so, for example, one has a Tg greater than the other. Different pairs of polymers can be chosen to exhibit useful properties over different temperature ranges. For example, because of polystyrene's higher Tg, upon interpenetrating a polyvinyl acetate network it will extend the modulus and reduce distortion of the matrix at elevated temperatures.

In general, the various combinations of monomers can be chosen for the first polymer emulsion or the second monomer emulsion. However, the monomer chosen for the first monomer emulsion cannot be an inhibitor to or retard the polymerization of the monomer in the second monomer emulsion. Since acrylonitrile is an inhibitor to the polymerization of vinyl acetate, the vinyl acetate must be in the first polymer emulsion while the acrylonitrile is in the second monomer emulsion. Thus, in a preferred embodiment, the first polymer emulsion contains polyvinyl acetate, vinylacetate-ethylene copolymer or vinylacetate-butylacrylate copolymer, while the second monomer emulsion contains either styrene, methyl methacrylate, acrylonitrile or butylacrylate, or mixtures thereof.

When the resultant polymer emulsion is to be used in a coating or printing ink, preferred polymer combinations include wherein the first polymer network contains either a polyvinylacetate, a vinylacetate-ethylene copolymer, a vinylchloride ethylene copolymer, a polyvinyl propionate or a vinylacetate-acrylic copolymer (preferably where the acrylic comonomer is a methyl, ethyl, butyl or 2-ethyl hexyl acrylate) and wherein the second polymer network contains either polystyrene, an acrylonitrile-acrylate copolymer, a styrene-butadiene copolymer or a styrene acrylic copolymer. In a preferred polymer combination the first polymer contains an ethylene-vinylacetate copolymer and the second polymer contains polystyrene, preferably at level of 5 to 40% on a solids by weight basis of the emulsion.

The process of the present invention provides an interpenetrating network of polymers which are generally physically incompatible in that the polymers are not soluble in one another. In addition, this process provides a means of combining polymers which cannot readily be formed by copolymerization of their monomers. For example, vinyl acetate and styrene cannot generally be copolymerized and mixing or blending of the two polymers in emulsion form does not result in a polymer having desirable properties (e.g. poor pick strength).

The first polymer emulsion and optionally the second monomer emulsion contain an active crosslinking agent. By the term "active crosslinking agent" is meant a functional monomer which immediately provides crosslinking and branching of the polymer during the initial formation of the emulsion polymer (i.e. during the polymerization step) to increase the molecular weight of the emulsion polymer. Subsequent drying or other curing techniques are not required for the crosslinking and branching of the emulsion polymer by the active crosslinking agent. Monomers of this type generally comprise compounds which contain 2 to 5 ethylenically unsaturated groups in one molecule separated by an ester or ether group, or by an aromatic or nitrogenous ring structure, where the unsaturated groups are capable of undergoing addition polymerization by free radical means. Suitable active crosslinking agents include alkylene glycol diacrylates and methacrylates, such as ethylene glycol diacrylate, 1,3-butylene glycol diacrylate, propylene glycol diacrylate, triethylene glycol dimethacrylate etc., 1,3-glycerol dimethacrylate, 1,1,1-trimethylol propane dimethacrylate, 1,1,1-trimethylol ethane diacrylate, pentaerythritol trimethacrylate, sorbitol pentamethacrylate, methylene bismethacrylamide, divinyl benzene, vinyl methacrylate, vinyl crotonate, vinyl acrylate, divinyl adipate; also di- and tri-allyl compounds, such as triallyl cyanurate, triallyl isocyanurate, diallyl phthalate, allyl methacrylate, allyl acrylate, diallyl maleate, diallyl fumarate, diallyl itaconate, diallyl malonate, diallyl carbonate, triallyl citrate, triallyl aconitate; also divinyl ether, ethylene glycol divinyl ether and the like. The amount of active crosslinking agent in the polymer emulsion of the present invention is from about 0.01 to 1.0 percent, preferably from about 0.05 to 0.25 percent by weight of the polymer.

The first polymer emulsion or the second monomer emulsion, preferably both, additionally contain a latent crosslinking agent. By the term "latent crosslinking agent" is meant a polyfunctional monomer wherein a portion of the functionality enters into the polymerization with other monomers in the polymer emulsion, with the residual functionality causing crosslinking of the polymer upon the subsequent application of energy generally by applying heat, e.g. by drying and curing of the latex particles, often in the presence of a catalyst, or by applying radiation. The latent crosslinking agent provides thermosetting characteristics to the polymer emulsion. Upon the subsequent application of energy the latent crosslinking agent forms an insoluble crosslinking network, with the crosslinking being triggered generally by heat or radiation after the polymer emulsion has been formed and applied. Examples of latent crosslinking agents are: N-alkylolamides of alpha, beta ethylenically unsaturated carboxylic acids having 3–10 carbons, such as N-methylol acrylamide, N-ethanol acrylamide, N-propanol acrylamide, N-methylol methacrylamide, N-ethanol methacrylamide, N-methylol malemide, N-methylol maleamide, N-methylol maleamic acid, N-methylol maleamic acid esters; the N-alkylol amides of the vinyl aromatic acids, such as N-methylol-p-vinylbenzamide and the like; also N-(alkoxymethyl) acrylates and methacrylates, where the alkyl group has from 1–8 carbon atoms, such as N-(methoxymethyl) acrylamide, N-(butyoxymethyl) acrylamide, N-(methoxymethyl) methacrylamide; N-methylol allyl carbamate and the N-alkoxymethyl derivatives such as N-(butyoxymethyl) allyl carbamate and N-(methoxymethyl) allyl carbamate and the like, and mixtures of these monomers with allyl carbamate, acrylamide or methacrylamide. Epoxy containing monoethylenically unsaturated compounds, such as glycidyl acrylate, glycidyl methacrylate and vinyl glycidyl ether function as latent crosslinking monomers often in conjunction with mono- and diethylenically unsaturated carboxylic acids, such as acrylic, methacrylic and itaconic acid, when catalyzed with an alkaline catalyst, such as potassium or sodium carbonate, diethylenetriamine and the like. Hydroxyethyl acrylate, hydroxypropyl acrylate and the corresponding methacrylates provide latent crosslinking when combined with N-alkylolamides of alpha, beta ethylenically unsaturated acids having 3–10 carbon atoms or with the acids themselves by ester formation. Another group of latent crosslinking monomers is described in U.S. Pat. Nos. 3,678,098 and 4,009,314. These are cationic chlorohydrin compounds having the following formula:

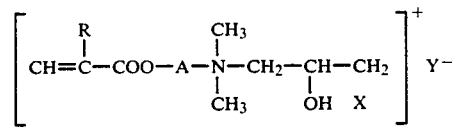

where R = methyl or H
A = alkylene
X,Y = halogen

The crosslinking reaction of these monomers is also catalyzed by the alkaline compounds mentioned above. The amount of latent crosslinking agent in the polymer of the present invention is about from 0.5 to 10 percent, preferably from about 2 to 6 percent by weight of the polymer.

The emulsions of the present invention are prepared in the presence of suitable anionic, cationic or nonionic emulsifiers or mixtures thereof. Optionally, a water soluble protective colloids, illustrated by polyvinyl alcohol, hydroxyethyl cellulose, and a water soluble styrene acrylic acid copolymer may also be present. Suitable nonionic emulsifying agents include alkylphenoxypolyethoxyethanols having alkyl groups of about 7 to 18 carbon atoms and 5 to 60 or more oxyethylene units, such as octylphenoxypolyethoxyethanols, methyloctylphenoxypolyethoxyethanols, nonylphenoxypolyethoxyethanols, dodecylphenoxypolyethoxyethanols; also ethylene oxide derivatives of long chained carboxylic acids, such as lauric, myristic, palmitic, oleic, and stearic acid, containing 5 to 60 oxyethylene units per molecule; also analogous ethylene oxide condensates of long-chained alcohols, such as octyl, decyl, lauryl, stearyl and cetyl alcohols, ethylene oxide derivatives of etherified or esterified polyhydroxy compounds having a hydrophobic component, such as lauric, myristic, palmitic, oleic, and stearic acid, containing 10 to 60 oxyethylene units per molecule; also analogous ethylene oxide condensates of long-chained alcohols, such as octyl, decyl, lauryl, stearyl, and cetyl alcohols, ethylene oxide derivatives of etherified or esterified polyhydroxy compounds having a hydrophobic hydrocarbon chain, such as sorbitan monostearate containing 10 to 60 oxyethylene units; also block copolymers of ethylene oxide and propylene oxide comprising a hydrophobic propylene oxide section combined with one or more hydrophilic ethylene oxide sections. Suitable anionic emulsifying agents include higher fatty alcohol sulfates, such as sodium lauryl sulfate, the alkylaryl sulfonates, such as the sodium salt of t-octylphenyl sulfonate, the sodium dioctyl sulfosuccinates, disodium fatty alkyl alkanolamide sulfosuccinate, and the ammonium salt of a sulfate or phosphate ester of an alkylphenoxy poly(ethyleneoxy) ethanol, where the oxyethylene content is from 3 to 30 moles per alkylphenol. Suitable cationic emulsifiers include N-dodecyl trimethyl ammonium chloride, and N-vinyl benzyl trimethyl ammonium chloride and the like. Generally, the polymer emulsions of this invention contain from 1 to 10 percent, preferably from 3 to 6 percent, emulsifiers based on the weight of the monomers (solids).

An ethylenically unsaturated carboxylic acid is also preferably added to the polymer emulsions to provide mechanical stability to the emulsion. Generally, an ethylenically unsaturated mono- or dicarboxylic acid may be used to provide the carboxyl functionality to the copolymer. Examples of suitable acids include the monocarboxylic ethylenically unsaturated acids such as acrylic, crotonic, and methacrylic acid; the dicarboxylic ethylenically unsaturated acids such as maleic, fumaric, itaconic, and citraconic acid, as well as the half esters of these dicarboxylic acids with $C_1$–$C_{12}$ alcohols. Examples of these monomeric acids are monomethylmaleate, monoethylmaleate, monobutylmaleate, and mono(2-ethylhexyl)maleate and the like. The polymer emulsions preferably contain from 0.1 to 0.5 percent of unsaturated carboxylic acids based on the weight of the monomers (solids).

In one embodiment, in a polymerization process which can be used in making the first polymer emulsion of the invention an aqueous phase is prepared first containing water, a small portion of a nonionic emulsifier, sometimes also a mixture of anionic and nonionic emulsifiers, and a very small amount of ferrous sulfate, being a redox component in the catalyst system or the finishing catalyst system for the polymer emulsion. The aqueous phase is purged well with nitrogen, and heated to polymerization temperatures (e.g. 40° to 70° C.). A small portion of monomer (and redox component for certain systems such as vinylacetate-ethylene copolymers), is then added followed by a suitable amount of initial catalyst, most often from about 1 to 3 percent based on the weight of the initial monomer charge. Often it is advantageous to use potassium persulfate as the catalyst because the resulting polymer has better resistance to heat discoloration. But sodium or ammonium persulfates can also be used. After the emulsion polymerization has initiated, the rest of the monomers are gradually added to the reaction mixture, often emulsified in water together with the latent crosslinking agents and the active crosslinking agents. Generally, the gradual addition of the monomers is carried out over a time period of one to five hours. More catalyst solution (and redox component in certain systems) is also added gradually to maintain the polymerization reaction. Often cooling is applied to the reaction vessel by means of a waterbath to remove the excess heat of polymerization. Usually, a total of 0.2 to 1 percent of catalyst (and 0.2 to 1% of redox component in certain systems) based on the weight of the monomers, is added over the course of the emulsion polymerization. After all the monomer has been added optionally a small amount of an organic peroxide, such as t-butyl hydroperoxide and cumene hydroperoxide, and the like can be added for the finishing step, together with a small amount of a reducing agent, such as sodium metabisulfate, sodium formaldehyde sulfoxylate, zinc formaldehyde sulfoxylate and ascorbic acid. In place of an organic peroxide, hydrogen peroxide or persulfates, such as potassium, sodium or ammonium persulfates may also be used. The terminal catalyst necessary to finish the the reaction is generally about 10 to 30 percent by weight of the total amount of catalyst consumed during the reaction. The reducing agent is ordinarily added in the necessary equivalent amount. Normally no buffering agent is required to keep the pH between 3 and 5. If necessary, dilute ammonia or a dilute solution of sodium acetate or sodium bicarbonate may be added from time to time to adjust the pH within those limits. Others auxiliary agents may be added to the finished polymer emulsion, such as defoamers, biocides and the like.

After the first polymer emulsion is cooled a second monomer or mixture of monomers is introduced into the reactor, preferably as fast as possible. The second monomer can be either added as an emulsion to the first polymer emulsion or as a monomer or mixture of monomers which are emulsified during mixing with the first polymer emulsion. Water, emulsifier and a small amount of ferous sulfate (redox component) are also often added either with the second monomer or after equilibration.

Following thorough mixing and equilibration (e.g. 10 to 60 minutes) of the first polymer emulsion and second monomer emulsions a second polymerization step is initiated by the addition of catalyst solution and then the reducing solution.

The polymer emulsion of this invention generally contains from 5 to 95%, preferably 60 to 95% on a solids by weight basis of the first polymer emulsion and 5 to 40% on a solids by weight basis of the second polymer emulsion.

The polymer emulsions of the present invention are useful as binders, adhesives and coatings. These polymer emulsions when used as binders provide high temperature resiliency to bonded fiberfill products. The polymer emulsions are useful in bonding textile fibers in a fiberfill product or other nonwoven product or even in traditional woven or knitted textile fabrics. Generally, based on the weight of the fiberfill product the binder can comprise 2 to 50%.

The polymer emulsions of this invention are useful in coatings, particularly as a coating binder for paper and paper board. The coating containing the polymer emulsion can be used to provide a smoother surface and increased strength, whiteness and gloss to a paper or paperboard product. In addition to the polymer emulsion binder the coating can contain proteins, polyvinyl alcohol, alginates, resins or modified or unmodified starches as binders. Other conventional ingredients can be included in the coating such as pigments (including titanium dioxide and/or calcium carbonate), lubricants (e.g. calcium stearate), insolubilizers (e.g. glyoxal resins to crosslink starch), defoamers, biocides (to prevent mildew), preservatives and the like. Paper can be treated with the coating by a variety of coating techniques including size press, air knife coating, blade coating, gravure coating, puddle coating, spray or kiss roll. Some specialty papers apply polymer emulsions with or without fillers with these processes. The unique characteristics of these specialty papers can be enhanced and/or delivered at a lower cost by using the polymer emulsions of this invention.

The polymer emulsions of this invention are also useful as binders in printing ink compositions. The polymer emulsion provides a carrier for the pigment in the ink and acts as a binder in affixing the pigment to the printed surface. Printing inks prepared with the polymer emulsions upon printing show high gloss and good heat resistance and coverage of the paper.

A printing ink composition will contain generally 5 to 95%, preferably 20 to 60% of the polymer emulsion (wet basis, 45% solids) or 2 to 45%, preferably 5 to 30%, of the polymer on a solids basis by total weight of the printing ink. The printing ink additionally contains pigment as well as supplemental ingredients to impart special characteristics including isopropyl alcohol, driers, waxes, lubricants, reducing oils, antioxidants, binders, gums, starches, surface active agents as well as other resins. In a preferred embodiment the polymer emulsion is combined with one of the following resins to impart superior printing properties: alkyds, urethanes, styrene-maleic anhydride resin and styrene-acrylic acid resins. In a preferable embodiment the printing ink is water-based ink and preferably a flexographic ink.

EXAMPLE 1

A polymer emulsion is prepared as follows containing a polymer which is an interpenetrating network of polyvinyl acetate and polystyrene.

The following was charged to a 100 gal. (379 liter) stainless steel pilot reactor equipped with a variable agitator, temperature control system, feedpumps, means for purging the reactor with nitrogen, and a jacket for heating and cooling:
  Water: 140 lbs. (63.5 kg)
  Triton X 305 (1): 6 lbs. 10 oz. (3 kg)
  Emcol K8300 (2): 8 oz. (227 g)

The contents of the reactor were heated to 67° C. after which the reactor was purged with nitrogen. After the heat-up and purge the following monomer was added to the reactor:
  Vinyl acetate: 26 lbs. (11.8 kg)

This was followed by the addition of the initial catalyst solution:
  Water: 10 lbs. (4.5 kg)
  Potassium persulfate: 8 oz. (227 g)

The polymerization initiated within 5 minutes as indicated by a 2° C. rise in temperature of the reactor. The following first monomer emulsion, made up previously, was then added gradually by means of an addition pump at a rate of 1.56 lbs. (0.71 kg)/minute over a 3½ hour period:
  Water: 58 lbs. (26.3 kg)
  Emcol K8300 (2): 8 lbs. 8 oz. (3.9 kg)
  Triton X 305 (1): 2 lbs. 4 oz. (1.0 kg)
  N-Methylol acrylamide (49%): 19 lbs. (8.6 kg)
  Acrylamide (50%): 2 lbs. (0.9 kg)
  Monoethylmaleate: 12 oz. (340 g)
  JPS Sequesterent (5): 5 oz. (142 g)
  Vinyl acetate: 238 lbs. (108 kg)
  Triallyl cyanurate: 5 oz. (142 g)

The temperature of the reactor content was allowed to rise to 80° C. and was maintained there by the gradual addition at a rate of 0.362 lbs. (0.164 kg)/minute over a 3½ hour period of the following catalyst solution:
  Water: 75 lbs. (34 kg)
  Potassium persulfate: 9 oz. (255 g)

After 3½ hours, when all the first monomer emulsion and catalyst solution had been added to the reactor the following finishing catalyst solution was added:
  Water: 1 lb. (0.45 kg)
  Potassium persulfate: 2 oz. (57 g)

The temperature of the batch was maintained at 80° C. for an additional 30 minutes, after which the first polymer emulsion was cooled to 60° C. At this point a second monomer emulsion was introduced into the reactor, as fast as possible, in about 10 minutes, and mixed with the first polymer emulsion. The second monomer emulsion had been prepared before containing:
  Water: 50 lbs. (22.7 kg)
  Emcol K8300 (2): 3 lbs. (1.4 kg)
  Triton X 305 (1): 3 lbs. (1.4 kg)
  N-Methylol acrylamide (49%): 5 lbs. (2.3 kg)
  Styrene: 100 lbs. (45.4 kg)
  Ferrous sulfate: 1 gram The temperature of the reactor content was maintained at 60° C. and allowed to equilibrate (½ hour) while the reactor was again purged with nitrogen after which the following catalyst solution was added to the reactor:
  Water: 19 lbs. (8.6 kg)
  Potassium persulfate: 1 lb. (0.5 kg)
  t-butyl hydroperoxide: 8 oz. (227 g)

The second polymerization step was initiated by adding half of the following reducing solution:
  Water: 16 lbs. (7.3 kg)
  Hydrosulfite AWC (3): 6 oz. (170 g)

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:
  Water: 4 lbs. (1.8 kg)
  Zinc nitrate solution in water (50%): 14 oz. (397 g)
  Phosphoric acid: 7 oz. (198 g)
followed by a second post-add as follows:
  Water: 2 lbs. (0.9 kg)
  Proxel GXL (4): 1½ oz. (43 g)
  Formaldehyde (37%): 1½ oz. (43 g)

A total of 55 lbs. (24.9 kg) of rinsewater was added to the emulsion for clean up of the pumps and lines.

Notes:
(1) Triton X 305 is a 70 percent solution in water of an octylphenoxy-polyethoxyethanol containing 30 moles of oxyethanol per mole of octyl phenol. It is supplied by the Rohm & Haas Company.
(2) Emcol K8300 is a 40 percent solution in water of disodium fatty alkyl alkanolamide sulfosuccinate supplied by the Witco Chemical Company.
(3) Hydrosulfate AWC is a brand of sodium formaldehyde sulfoxylate supplied by the Diamond Shamrock Company.
(4) Proxel GXL is a biocide supplied by the ICI Company.
(5) JPS Sequesterant is a brand of diethylenetriamine pentaacetic acid supplied by the Intex Products Company.

The polymer emulsion thus obtained had the following properties:
  solids (30 min. at 130° C. drying): 46.3% pH: 3.5 viscosity (Brookfield at 50 RPM): 78 cps intrinsic viscosity (measured in N-methyl pyrrolidone at (30° C.) (6): 1.5 dl/g particle size (by light transmission) (7): 0.33 microns Notes:
(6) In measuring the intrinsic viscosity, a 1 ml sample of the polymer emulsion is added to 100 ml of N-methyl pyrrolidone, and the mixture is agitated and filtered. The flowtime of the solution so prepared is then compared at 30° C. with the flow time of the N-methyl pyrrolidone solvent using a Ubbelohde viscometer (obtained from the Cannon Instrument Company) the relative viscosity is the fraction obtained by dividing the flowtime of the solution by the flowtime of the solvent. The Huggins equation is then used to calculate the intrinsic viscosity from the relative viscosity measurement and from the polymer solids content in grams per 100 ml of solution. The use of the Huggins equation for intrinsic viscosity calculations is described in detail in the "Encyclopedia for Polymer Science and Technology", (Wiley, New York, 1971) Vol. 15, page 634.
(7) The particle size was measured by light transmission using a Beckman spectrophotometer (Spectronic 20). The method is described in detail in "Official Digest of the Paint and Varnish Industry", February 1959, pages 200-213.

EXAMPLE 2

A polymer emulsion is prepared containing a polymer which is an interpenetrating network of polyvinyl acetate and polymethyl methacrylate.

The following was charged to a 100 gal. (379 liter) stainless steel pilot reactor equipped with a variable agitator, temperature control system, feedpumps, means for purging the reactor with nitrogen, and a jacket for heating and cooling.

Water: 140 lbs. (63.5 kg)
Triton X 305 (1): 6 lbs. 10 oz. (3 kg)
Emcol K8300 (2): 8 oz. (227 g)

The contents of the reactor were heated to 67° C. after which the reactor was purged with nitrogen. After the heat-up and purge the following monomer was added to the reactor:

Vinyl acetate: 26 lbs. (11.8 kg)

This was followed by the addition of the initial catalyst solution:

Water: 10 lbs. (4.5 kg)
Potassium persulfate: 8 oz. (227 g)

The polymerization initiated within 5 minutes as indicated by a 2° C. rise in temperature of the reactor. The following first monomer emulsion, made up previously, was then added gradually by means of an addition pump at a rate of 1.56 lbs. (0.71 kg)/minute over a 3½ hour period:

Water: 58 lbs. (26.3 kg)
Emcol K8300 (2): 8 lbs. 8 oz. (3.9 kg)
Triton X 305 (1): 2 lbs. 4 oz. (1.0 kg)
N-Methylol acrylamide (49%): 19 lbs. (8.6 kg)
Acrylamide (50%): 2 lbs. (0.9 kg)
Monoethylmaleate: 12 oz. (340 g)
JPS Sequesterent (5): 5 oz. (142 g)
Vinyl acetate: 238 lbs. (108 kg)
Triallyl cyanurate: 5 oz. (142 g)

The temperature of the reactor content was allowed to rise to 80° C. and was maintained there by the gradual addition at a rate of 0.362 lbs. (0.164 kg)/minute over a 3½ hour period of the following catalyst solution:

Water: 75 lbs. (34 kg)
Potassium persulfate: 9 oz. (225 g)

After 3½ hours, when all the first monomer emulsion and catalyst solution had been added to the reactor the following finishing catalyst solution was added:

Water: 1 lb. (0.45 kg)
Potassium persulfate: 1½ oz. (57 g)

The temperature of the batch was maintained at 80° C. for an additional 30 minutes, after which the first polymer emulsion was cooled to 60° C. At this point a second monomer emulsion was introduced into the reactor as fast as possible, in about 10 minutes, and thoroughly mixed with the first polymer emulsion. The second monomer emulsion had been prepared before containing:

Water: 50 lbs. (22.7 kg)
Emcol K8300 (2): 3 lbs. (1.4 kg)
Triton X 305 (1): 3 lbs. (1.4 kg)
N-Methylol acrylamide (49%): 5 lbs. (2.3 kg)
Methyl methacrylate: 100 lbs. (45.4 kg)
Ferrous sulfate: 1 gram The temperature of the reactor content was maintained at 60° C. and allowed to equilibrate (about ½ hour), while the reactor was again purged with nitrogen after which the following catalyst solution was added to the reactor:

Water: 19 lbs. (8.6 kg)
Potassium persulfate: 1 lb. (0.5 kg)
t-butyl hydroperoxide: 8 oz. (227 g)

The second polymerization step was initiated by adding half of the following reducing solution:

Water: 16 lbs. (7.3 kg)
Hydrosulfite AWC (3): 6 oz. (170 g)

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:

Water: 4 lbs. (1.8 kg)
Zinc nitrate solution in water 50%: 14 oz. (397 g)
Phosphoric acid: 7 oz. (198 g)

followed by a second post- add as follows:

Water: 2 lbs. (0.9 kg)
Proxel GXL (4): 1½ oz. (43 g)
Formaldehyde (37%): 1½ oz. (43 g)

A total of 60 lbs. (24.9 kg) of rinsewater was added to the emulsion for clean up of the pumps and lines.

The polymer emulsion thus obtained had the following properties:

solids (30 min at 130° C. drying): 45.0%
pH: 4.0
viscosity (Brookfield at 50 RPM): 32 cps
intrinsic viscosity (measured in N-methyl pyrrolidone at 30° C.)(6): 2.3 dl/g
particle size (by light transmission) (7): 0.27 microns

EXAMPLE 3

Ethylene-vinylacetate copolymer emulsions, Examples E and I, were prepared as follows:

The following was charged to a 10 gal. stainless steel pressure reactor equipped with a variable agitator set at 60 rpm, temperature control system, feedpumps, means for purging the reactor with nitrogen and pressurizing with ethylene, and an internal coil for heating and cooling:

|  | Example I | Example E |
|---|---|---|
| Water (deionized) | 7500 g. | 7500 g. |
| Emcol K8300 (2) | 120 g. | 120 g. |
| Triton X 405 (8) | 85 g. | 85 g. |
| Tamol SN (9) | 17 g. | 17 g. |
| Ferrous sulfate (10% Solution) | 8 g. | 8 g. |

The contents of the reactor were heated to 45°–50° C., the reactor was purged with nitrogen once, and with ethylene twice to 10 psi. followed by the addition of:

|  | Example I | Example E |
|---|---|---|
| Vinyl acetate | 400 g. | 400 g. |

The reactor was then pressurized with ethylene to 800 psi. This was followed by the addition of the following initial catalyst solution:

|  | Example I | Example E |
|---|---|---|
| Water (deionized) | 200 g. | 200 g. |
| Ammonium persulfate | 13 g. | 13 g. |

The polymerization was initiated by adding an activator solution at a rate of 5 g/min. which was made up as follows:

|  | Example I | Example E |
|---|---|---|
| Water (deionized) | 1500 g. | 1500 g. |
| Hydrosulfite AWC (3) | 50 g. | 50 g. |

The polymerization initiated within 5 minutes as indicated by a rise in reactor temperature.

The following monomer emulsion, prepared previously was then added gradually by means of an addition pump at a rate of 43 g/min. over a 3 hour period.

|  | Example I | Example E |
|---|---|---|
| Water (deionized) | 4000 g. | 4000 g. |
| Emcol K8300 (2) | 250 g. | 250 g. |
| Monoethyl maleate | 140 g. | 140 g. |
| Ammonium hydroxide (28%) | 9 g. | 9 g. |
| Vinyl acetate | 8300 g. | 8300 g. |
| Triallyl cyanurate | 1 g. | 1 g. |
| Ammonium persulfate | 100 g. | 100 g. |

The temperature of the reactor content was allowed to rise to 55° C. and was maintained there by the addition of the above mentioned activator solution as needed. At this point the ethylene pressure rose to 900 psi and was maintained there by setting the ethylene supply valve to 900 psi for Example E and to 1100 psi for Example I. A total of 1500 g for Example I and 881 g for Example E of the activator solution was used.

After 3–3½ hours, when all the monomer emulsion and activator solution had been added to the reactor the following finishing catalyst solution was added:

|  | Example I | Example E |
|---|---|---|
| Water (deionized) | 400 g. | 200 g. |
| Ammonium persulfate | 25 g. | 20 g. |
| T-butyl hydroperoxide | 15 g. | 5 g. | followed by addition of the following finishing activator solution:

|  | Example I | Example E |
|---|---|---|
| Water (deionized) | 400 g. | 200 g. |
| Hydrosulfite AWC (4) | 20 g. | 10 g. |

The temperature of the batch was maintained at 60° C. for an additional hour after which the free vinyl acetate monomer concentration had fallen below 1%. The polymer emulsion was then cooled to 30° C. and the ethylene vented from the reactor to ambient pressure. The following solution was then added to the batch:

|  | Example I | Example E |
|---|---|---|
| Water (deionized) | 500 g. | 500 g. |
| Triton X 405 (8) | 85 g. | 85 g. |
| Ammonium hydroixde (28%) | 50 g. | 50 g. |

The ethylene-vinylacetate copolymer emulsions had the following properties:

|  | Example I | Example E |
|---|---|---|
| solids (30 min at 130° C. drying) | 44.6% | 42.3% |
| pH | 7.4 | 6.8 |
| viscosity (Brookfield at 50 RPM) | 41.6 cps | 30.4 cps |
| intrinsic viscosity, (measured in N—methyl pyrrolidone at 30° C.)(6) | 1.50 dl/g | 1.56 dl/g |
| particle size (by light transmission)(40) | 0.13 microns | 0.13 microns |
| ethylene content of the copolymer | 18.5% | 8.8% |

Notes:
(8) Triton X 405 is a 70 percent solution in water of an octylphenoxypolyethoxyethanol containing 30 moles of oxyethanol per mole of octyl phenol. It is supplied by the Rohm & Haas Company.
(9) Tamol SN is a dispersant supplied by the Rohm & Haas Company.
(10) The particle size was measured by light transmission using a Coulter Counter.

EXAMPLE 4

Polymer emulsions were prepared containing an interpenetrating network of vinylacetate-ethylene copolymer and varying amounts of polystyrene.

The following was charged to a 1 liter glass reactor equipped with a variable agitator, temperature control system, feedpumps, and a water bath for heating and cooling:

|  | Ex. B | Ex. C | Ex. D |
|---|---|---|---|
| Airflex 100 HS (11) | 1819.8 g | 1611.3 g | 1392.2 g |
| Water (deionized) | 474.4 g | 568.7 g | 361.2 g |
| Emcol K8300 (2) | 7.3 g | 14.7 g | 21.7 g |
| Triton X 405 (8) | 4.4 g | 8.8 g | 13.0 g |
| Sipomer DS 10 (12) | 1.6 g | 1.6 g | 4.8 g |
| Monoethyl maleate | 1.2 g | 2.4 g | 3.6 g |
| Styrene | 112.2 g | 223.3 g | 330.6 g |
| Divinyl benzene | 0.12 g | 0.22 g | 0.32 g |
| Ammonium persulfate | 1.9 g | 3.8 g | 5.7 g |
| t-Butyl hydroperoxide | 0.5 g | 0.9 g | 1.4 g |

The batch was heated to 55° C., after equilibration the following activator solution was added:

|  | | | |
|---|---|---|---|
| Water (deionized) | 4.9 g | 9.7 g | 14.4 g |
| Hydrosulfite AWC (3) | 1.0 g | 2.0 g | 2.9 g |

After leaving the batch at 80° C. for 2–5 hours it was then cooled to room temperature and the following solution was added:

|  | Ex. B | Ex. C | Ex. D |
|---|---|---|---|
| Water | 26.1 g | 26.1 g | 26.1 g |
| Triton X 405 (8) | 13.2 g | 13.2 g | 13.2 g |
| Ammonium hydroxide | 9.4 g | 9.4 g | 9.4 g |

-continued

|  | Ex. B | Ex. C | Ex. D |
|---|---|---|---|
| (28%) | | | |
| Formaldehyde (37%) | 0.7 g | 0.7 g | 0.7 g |
| Proxel GXL (13) | 1.4 g | 1.4 g | 1.4 g |

The interpenetrating network containing emulsions had the following properties:

|  | Ex. B | Ex. C | Ex. D |
|---|---|---|---|
| solids (30 min at 130° C. drying) | 45.5% | 45.3% | 45.4% |
| pH | 5.2 | 7.9 | 4.9 |
| viscosity (Brookfield at 50 RPM) | 49.6 cps | 53.6 cps | 37.6 cps |
| intrinsic viscosity (measured in N—methyl pyrrolidone at 30° C.)(6) | 1.14 dl/g | 0.99 dl/g | 1.24 dl/g |
| particle size (10) | 0.16 microns | 0.18 microns | 0.19 microns |
| free styrene | 0.01% | 0.11% | 0.26% |
| total polystyrene content | 10% | 20% | 30% |

Notes:
(11) Airflex 100 HS is a vinyl acetate-ethylene copolymer emulsion having an approximate ethylene content of about 15%. It is supplied by Air Products and Chemicals Corp.
(12) Sipomer DS 10 is a brand of sodium dodecyl benzene sulfonate supplied by the Alcolac Chemical Co.
(13) Proxel GXL is a biocide supplied by ICI.

EXAMPLE 5

Polymer emulsions were prepared containing an interpenetrating network of vinyl acetate-ethylene (from Example 4) and varying amounts of polystyrene.

The following was charged to a 1 liter glass reactor equipped with a variable agitator, temperature control system, feedpumps, and a water bath for heating and cooling:

|  | Ex. F. | Ex. G | Ex. H | Ex. J | Ex. K | Ex. L |
|---|---|---|---|---|---|---|
| Vinyl acetate-ethylene copolymer | | | | | | |
| (Ex. E) | 277.3 g | 251.4 g | 225.7 g | — | — | — |
| (Ex. I) | — | — | — | 264.9 g | 240.8 g | 208.8 g |
| Water (deionized) | 1.4 g | 3.0 g | 4.7 g | 1.4 g | 13.3 g | 22.3 g |
| Monoethyl maleate | 0.1 g | 0.3 g | 0.4 g | 0.1 g | 0.2 g | 0.3 g |
| Styrene | 13.1 g | 27.2 g | 41.1 g | 12.4 g | 26.8 g | 39.8 g |
| Divinyl benzene | 0.01 g | 0.03 g | 0.04 g | 0.01 g | 0.03 g | 0.04 g |
| Ammonium persulfate | 0.2 g | 0.3 g | 0.8 g | 0.2 g | 0.4 g | 0.6 g |
| t-Butyl hydroperoxide | 0.1 g | 0.1 g | 0.2 g | 0.1 g | 0.2 g | 0.3 g |

The batch was heated to 55° C., after equilibration the following activator solution was added:

|  | Ex. F | Ex. G | Ex. H | Ex. J | Ex. K | Ex. L |
|---|---|---|---|---|---|---|
| Water (deionized) | 5.0 g | 13.0 g | 15.4 g | 10.0 g | 15.0 g | 15.3 g |
| Hydrosulfite AWC (3) | 0.1 g | 0.3 g | 0.3 g | 0.2 g | 0.3 g | 0.3 g |

After initiation which was observed by an increase in temperature, the following emulsifier solution was added over 15 minutes:

|  | Ex. F | Ex. G | Ex. H | Ex. J | Ex. K | Ex. L |
|---|---|---|---|---|---|---|
| Water (deionized) | 2.9 g | 5.8 g | 9.0 g | 2.9 g | 6.0 g | 8.9 g |
| Emcol K8300 (2) | 0.9 g | 1.8 g | 2.8 g | 0.6 g | 1.8 g | 1.9 g |
| Triton X 405 (8) | 0.6 g | 1.1 g | 1.7 g | 0.9 g | 1.3 g | 2.7 g |
| Sipomer DS 10 (12) | 0.2 g | 0.4 g | 0.6 g | 0.2 g | 0.4 g | 0.6 g |

After leaving the batch at 57°-58° C. for 2 hours it was then cooled to room temperature and the following solution was added:

|  | Ex. F | Ex. G | Ex. H | Ex. J | Ex. K | Ex. L |
|---|---|---|---|---|---|---|
| Water | 4.1 g | 4.1 g | 4.1 g | 4.1 g | 4.1 g | 4.1 g |
| Triton X 405 (8) | 2.1 g | 2.1 g | 2.1 g | 2.1 g | 2.1 g | 2.1 g |
| Ammonium hydroxide (28%) | 1.5 g | 1.5 g | 1.5 g | 1.5 g | 1.5 g | 1.5 g |
| Formaldehyde (37%) | 0.1 g | 0.1 g | 0.1 g | 0.1 g | 0.1 g | 0.1 g |
| Proxel GXL (13) | 0.2 g | 0.2 g | 0.2 g | 0.2 g | 0.2 g | 0.2 g |

The interpenetrating network containing emulsions had the following properties:

|  | Ex. F | Ex. G | Ex. H | Ex. J | Ex. K | Ex. L |
|---|---|---|---|---|---|---|
| solids (30 min at 130° C. drying) | 42.7% | 42.7% | 42.3% | 44.5% | 45.5% | 45.5% |
| pH | 5.3 | 7.0 | 6.0 | 5.45 | 5.3 | 5.4 |
| viscosity (Brookfield at 50 RPM) | 27.2 cps | 32.0 cps | 138.4 cps | 39.2 cps | 36.0 cps | 37.6 cps |
| intrinsic viscosity (measured in N—methyl pyrrolidone at 30° C.)(6) | 1.85 dl/g | 1.25 dl/g | 1.24 dl/g | 1.64 dl/g | 1.38 dl/g | 1.31 dl/g |
| particle size, microns (10) | 0.15 | 0.21 | 0.29 | 0.15 | 0.19 | 0.21 |
| free styrene | 0.48% | 0.61% | 0.58% | 0.33% | 0.35% | 0.85% |
| polystyrene content | 10% | 20% | 30% | 10% | 20% | 30% |

EXAMPLE 6

A series of paper coating formulations were made with vinylacetate-ethylene copolymer emulsions (Example 3) and with the same copolymer emulsions after a second stage polymerization with styrene to form an interpenetrating polymer network (IPN) of the copolymer emulsion with polystyrene (see Examples 4 and 5). Three basic vinylacetate-ethylene (VAE) emulsions were used as follows: a commercial product, Airflex 100HS sold by Air Products and Chemicals Corp., containing about 15% ethylene and with a Tg of +5° C.; an emulsion containing 8.8% ethylene (Example E) and with a Tg of 15° C.; and an emulsion containing 18.5% ethylene (Example I) and with a Tg of 0° C. All three VAE copolymer emulsions were further swelled by styrene monomer and polymerized as described in Examples B-D, F-H and J-L (Examples 4 and 5). The particle sizes and of the VAE and IPN emulsions are summarized as follows in Table 3:

TABLE 1

| Example | Emulsion Description | Particle Size(1) |
|---|---|---|
| A | Airflex 100 HS (15% Ethylene) | 0.160 um |
| B | with 10% Styrene | 0.162 um |
| C | with 20% Styrene | 0.182 um |
| D | with 30% Styrene | 0.192 um |
| E | VAE with 8.8% Ethylene | 0.134 um |
| F | with 10% Styrene | 0.148 um |
| G | with 20% Styrene | 0.205 um |
| H | with 30% Styrene | 0.292 um |
| I | VAE with 18.5% Ethylene | 0.127 um |
| J | with 10% Styrene | 0.149 um |
| K | with 20% Styrene | 0.191 um |
| L | with 30% Styrene | 0.207 um |

All emulsions of Examples A thru L were made into paper coating formulas of the following dry composition:

|  | Dry Weight (gms.) |
|---|---|
| Kaolin Clay | 350.0 |
| Anionic Dispersant | 5.3 |
| Ethoxylated Starch | 7.0 |
| Emulsion from Examples A-L | 18.9 |

As in standard paper coating formulation, the clay (ground clay, 92-94% finer than 2 microns) and dispersant (Dispex N-40 from Allied Corporation) were ground together in a Kady Mill at 70% solids for 30 minutes. Separately the starch (Penford Gum 280 from Penick & Ford Ltd.) was slurried at 25% solids and cooled at 190° F. for 20 minutes. This starch mix was added to the clay and dispersant mix and agitated. The polymer emulsions were then added to this composite mix and the coating formulation diluted to 64% solids for coating.

The relative performance of a paper in a printing press can be simulated in various laboratory tests. Offset printing is demanding on paper coatings. The coating is first wet with a water/alcohol solution and then printed with a thick, tacky ink. The multi-color printing there may be four or five applications in less than a second on a high speed press.

A 50#/ream groundwood-free base sheet was coated with 8# dry coat weight (CIS, coated on one side) on a bench paper coater made by Modern Metalcraft Company. This coated paper was then calendered 2 nips at 150° F. under a 600 pli pressure in a cotton/steel calender. After conditioning 24 hours under standard paper test conditions the paper coatings were tested for sheet gloss, smoothness, porosity, pick strength, Adam wet rub resistance, printed ink gloss and SIWA brightness. Sheet gloss, smoothness and porosity showed little variation between the vinylacetate-ethylene (VAE) emulsions and the interpenetrating polymer network (IPN) emulsions formed by the second stage polymerization with styrene.

The effect of the second stage polymerization in forming the IPN emulsions was apparent in pick strength, Adam wet rub resistance, printed ink gloss, and SIWA brightness tests. The results are as follows:

TABLE 2

|  | IGT Pick Strength (14) | Adam's Wet Rub (15) | 75° Ink Gloss (16) | SIWA (17) Brightness |
|---|---|---|---|---|
| A | 22 | 72 | 96 | 51.5 |
| B | 28 | 136 | 97 | 49.6 |
| C | 23 | 190 | 96 | 53.3 |
| D | 22 | 196 | 91 | 55.5 |
| E | 22 | 72 | 96 | 51.5 |
| F | 29 | 124 | 96 | 49.8 |
| G | 22 | 126 | 91 | 52.2 |
| H | 16 | 390 | 81 | 59.5 |
| I | 20 | 165 | 92 | 52.3 |
| J | 26 | 111 | 96 | 54.0 |
| K | 25 | 155 | 94 | 56.1 |
| L | 22 | 219 | 91 | 61.3 |

An additional evaluation compares the IPN emulsion with physical blends of an equivalent composition (i.e. blend of the vinylacetate-ethylene copolymer with a corresponding level of polystyrene). The blends are designated with an (').

TABLE 3

|  | IGT Pick Strength (14) | Adam's Wet Rub (15) | 75° Ink Gloss (16) | SIWA (17) Brightness |
|---|---|---|---|---|
| H(IPN) | 16 | 390 | 81 | 59.5 |
| H' (Blend) | 13 | 206 | 81 | 56.3 |
| J(IPN) | 26 | 111 | 96 | 54.0 |
| J' (Blend) | 26 | 251 | 91 | 58.9 |
| L(IPN) | 22 | 219 | 91 | 61.3 |
| L' (Blend) | 13 | 296 | 80 | 58.9 |

Notes: (14) The coating must be strong enough not to 'pick' when the ink applicator rolls off the surface. This is especially important on high speed presses and with tackier inks. The IGT pick strength (reported as a product of velocity and viscosity - VVP) is determined by using different viscosity oils and applying them at different speeds until the coating fails (picks). This establishes the coating's pick strength. Pick strength was measured on an AIC2-5 Model IGT pick tester sold by Techno Graphic Instruments. The test was run with a setting of 2m/s using LV oil and a pressure setting of 50 kg. LV oil is polybutene with a viscosity of 242 poise at 23° C. Pick Values in VVP (velocity-viscosity product as defined by IGT) are reported.
(15) The coating must accept the water solution but not soften or release pigment to the press (called 'milking' by printers). This is simulated by the Adams wet rub test in which the coating is wetted and rubbed mildly for 20 seconds. The amount of 'milking' is measured by the amount of coating removed (in milligrams) or by the opacity of the water solution.
(16) The ink must wet the coating but not absorb into the paper and lose its sharpness. This is measured as ink gloss on a glossmeter. Printed ink gloss was determined by placing a 4.8 um ink film on the coated paper and measuring gloss on a 75° Gardner Glossmeter II.
(17) In actual practice the ink may be applied over a previous water layer. If the paper does not absorb water sufficiently, the ink will not apply and the coating layer will remain unprinted. The simultaneous application of ink over water and subsequent measure of coverage is measured by SIWA brightness. High brightness numbers indicate less complete ink overage because the unprinted coating is brighter than the ink. SIWA brightness is a simulation of an offset printing process conducted on an IGT pick tester. A droplet of water is overprinted with ink Control-Lith II Blue from GPI Division of Sun Chemical Corporation) on a 15 micron printing disc at 2m/s. The brightness

TABLE 3-continued of the overprinted area is then measured on a GP
Photovolt brightness meter. Higher brightness values
indicate higher water holdout tendencies.

In all cases the second styrene polymerization forming the IPN emulsion increased the IGT pick strength. In fact, levels of about 10% styrene produced a maximum coating strength in all three vinylacetate-ethylene systems. Increasing from 10% to 30% styrene reduced pick strength back to the level of the original vinylacetate-ethylene emulsion probably due to the increased particle size at higher styrene levels. Both particle size and polymer composition affect paper coatings. Generally, with a given polymer composition, smaller polymer particle sizes will produce higher strength paper coatings. Here, for the various IPN polymers the particle size/strength relationship is not clear because of the differing polymer compositions. However, it is clear that the second polymerization of the IPN polymers increased the paper coating strength since even though the particle size increased, the IGT peek strength was greater than in the non-IPN polymer paper coatings.

Adam's wet rub results deteriorated with increasing styrene levels for Examples A-D and E-H but showed improvement in Examples J and K. Ink gloss (75°) also showed increases at lower levels of styrene, but a subsequent decrease in gloss at higher styrene levels. SIWA brightness increased with increasing styrene levels, with two systems decreasing slightly at low styrene levels, but increasing rapidly with further increases of styrene levels. In the above Examples IPN emulsions containing 10% styrene produced peak values in IGT strength and ink gloss.

Blending a polystyrene emulsion with the vinylacetate-ethylene copolymer emulsion did not produce the same results as forming an IPN emulsion with polystyrene in a second phase polymerization. The differences (shown in Table 3) are most pronounced in IGT pick strength, Adam's wet rub and 75° ink gloss. These are the three most important measures for predicting offset press runnability of coated papers and the improvements show the potential value of this invention on paper coating applications. Importantly this IPN emulsion can deliver excellent performance at a low cost since the starting materials are relatively low cost polymers.

EXAMPLE 7

An interpenetrating network of a vinyl acetate-ethylene copolymer (80%) and polystyrene (20%) was prepared as follows. The following was charged to a 1 liter glass reactor equipped with a variable agitator, temperature control system, feedpumps, and a water bath for heating and cooling:

Joncryl 678(28.4%)(18): 214.6 g
Ethylene-vinylacetate copolymer emulsion (Ex. E): 276.7 g The batch was heated to 70° C., after which the following was added:

Styrene: 29.4 g
Divinyl benzene: 0.02 g

After equilibration (15 minutes) the following catalyst solution was added:

Water (deionized): 8.3 g
Potassium persulfate: 0.8 g
Ammonium hydroxide: (28%) 0.09 g After leaving the batch at 75° C. for 5 hours the free styrene monomer had decreased to less than 1%, after which the batch was cooled to room temperature.

The interpenetrating polymer network containing emulsion had the following properities:

solids(30 min at 130° C. drying): 49.9%
pH: 8.5
viscosity(Brookfield at 50 RPM): 1806 cps
intrinsic viscosity(measured in N-methyl pyrrolidone at 30° C.[6]:0.89 dl/g
free styrene: 0.3%

Note:
(18) Joncryl 678 is a water soluble, styrenated acrylic resin sold by the Johnson Wax Corp. It was dissolved in ammonia water to the concentration indicated.

EXAMPLE 8

A control emulsion was prepared by blending the following:

Joncryl 678 (29.4%)[18]:144.8 g
Ethylene-vinylacetate copolymer emulusion (Ex. E): 250 g
Suncryl 7500[19]:54.8 g The control emulsion had the following properties:
solids(30 min at 130° C. drying): 46.1%
pH: 8.2
viscosity(Brookfield at 50 RPM): 1050 cps Note:
(19) Suncryl 7500 is a polystyrene emulsion sold by Sun Chemical Corp. for use as an ink binder.
(20) Suncryl 7800 is a styrene-acrylate copolymer emulsion sold by Sun Chemical Corp. for use as an ink binder.

EXAMPLE 9

Using the emulsions of Examples 7 and 8 and Suncryl 7500 (19) and Suncryl 7800 (20), the following printing inks were prepared: To 40 g of emulsion was added 10 g of isopropyl alcohol and mixed by hand for 5 minutes. To 35 g of this mixture was added 15 g of a 45.4% solids dispersion in water of the pigment Red Lake C. The ink was stirred by hand for another 5 minutes.

The inks were than applied to a black and white test paper with a Nr. 6 meyer rod and allowed to dry for about 5 minutes. All inks covered the test paper well and showed equal color value. The gloss was then measured with a Glossgard II, 75° glossmeter (Gardner Instrument Division, Silver Springs, Maryland). The glossmeter was first calibrated to a gloss reading of 50.1. The following gloss readings were obtained:

TABLE 4

| Ink Binder | Gloss Reading | Heat Resistance |
| --- | --- | --- |
| Emulsion of Ex. 7 | 80.9 | pass |
| Emulsion of Ex. 8 | 77.5 | fail |
| Suncryl 7500[19] | 55.8 | pass |
| Suncryl 7800[20] | 81.7 | pass |

The heat resistance, which is the resistance of aluminum foil to adhere to the emulsion coated paperboard when subjected to heat and pressure, was measured as follows. The emulsion was applied to a piece of clay coated paperboard with a Nr. 6 Meyer rod and allowed to dry for 5 minutes. After this time a piece of aluminum foil was placed on the dried polymer film and then heat-sealed to the paperboard with a Sentinel Heat Sealer (Packaging Industries, Hyannis, Mass.), using a pressure of 20 psi and a temperature of 250° C. After cooling the sample to ambient temperature the aluminum foil was carefully lifted up. Any paperboard which still had pieces of aluminum foil adhering to it was judged a failure. The results are tabulated in Table 4.

The ink made using the IPN emulsion of Example 7 had a much higher gloss than the commercial polystyrene emulsion (Suncryl 7500) and equal gloss to the more expensive styrene-acrylic copolymer emulsion (Suncryl 7800). The blend of the vinyl acetate-ethylene copolymer with the polystyrene emulsion (Example 8) had a inferior gloss to the IPN emulsion. The heat resistance of the blend of emulsions (Example 8) was inferior to that of the IPN emulsion.

What is claimed is:

1. A printing ink composition comprising: a pigment and an aqueous polymer emulsion containing a first polymer network containing an active crosslinking agent which is intertwined on a molecular scale with a second polymer network wherein the second polymer differs from the first polymer and the first polymer comprises 5 to 95% on a solids by weight basis of the emulsion.

2. Composition of claim 1 wherein the printing composition is a water-based printing ink composition.

3. Composition of claims 1 or 2 wherein the polymer of the first polymer network is chosen from the group consisting of polymethyl methacrylate, polyvinylacetate, polystyrene, polybutyl acrylate, vinylchloride-ethylene copolymer, vinylacetate-ethylene copolymer, vinylacetate-acrylic copolymer, polyvinylpropionate, polyacrylonitrile and copolymers thereof.

4. Composition of claim 3 wherein the polymer of the second polymer network is chosen from the group consisting of polyacrylo nitrile, polymethyl methacrylate, acrylonitrile-acrylate copolymer, styrene-butadiene copolymer, styrene-acrylic copolymer, polybutylacrylate, polystyrene and copolymers thereof.

5. Composition of claim 1 wherein the monomer of the first polymer and second polymer are not readily copolymerizeable.

6. Composition of claim 1 wherein the first polymer network contains a polymer chosen from the group consisting of polyvinyl acetate, vinylacetate-ethylene copolymer, polyvinylpropionate and vinylacetate-acrylic copolymer and the second polymer network is chosen from the group consisting of polystyrene, styrene-butadiene copolymer, acrylonitrile-acrylate copolymer and styrene-acrylic copolymer.

7. Composition of claim 6 wherein the first polymer network contains a vinylacetate-ethylene copolymer and the second polymer network contains styrene.

8. Composition of claim 7 wherein the second polymer network comprises 5 to 40% on a solids by weight basis of the emulsion.

9. Composition of claim 2 further comprising a water soluble protective colloid.

10. Composition of claim 2 further comprising a binder chosen from the group consisting of proteins, resins, polyvinyl alcohol, alginates and starches.

11. Composition of claim 2 wherein the polymer emulsion comprises 2 to 45% on a solids by weight basis of the printing ink composition.

* * * * *